Sept. 2, 1958
R. J. WISE ET AL
2,850,350
SELF ADJUSTING STYLUS
Filed Dec. 3, 1953
4 Sheets-Sheet 1
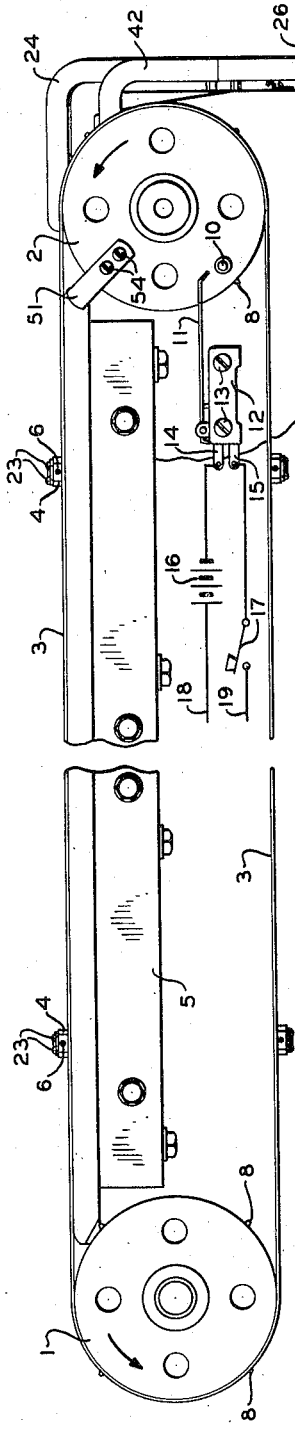
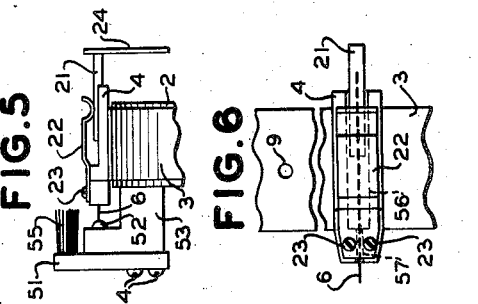
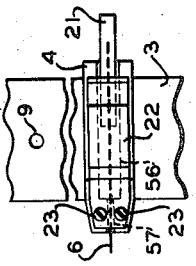
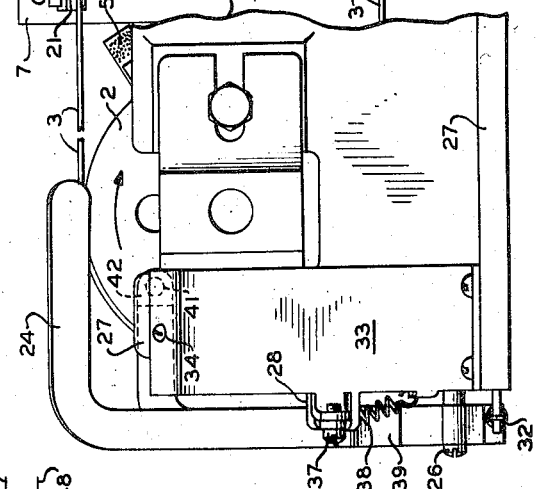
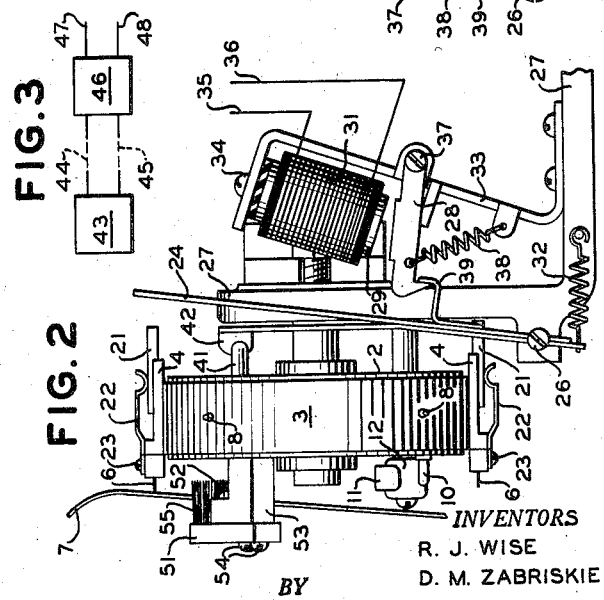
INVENTORS
R. J. WISE
D. M. ZABRISKIE
BY
ATTORNEY Sept. 2, 1958  R. J. WISE ET AL  2,850,350
SELF ADJUSTING STYLUS
Filed Dec. 3, 1953  4 Sheets-Sheet 2
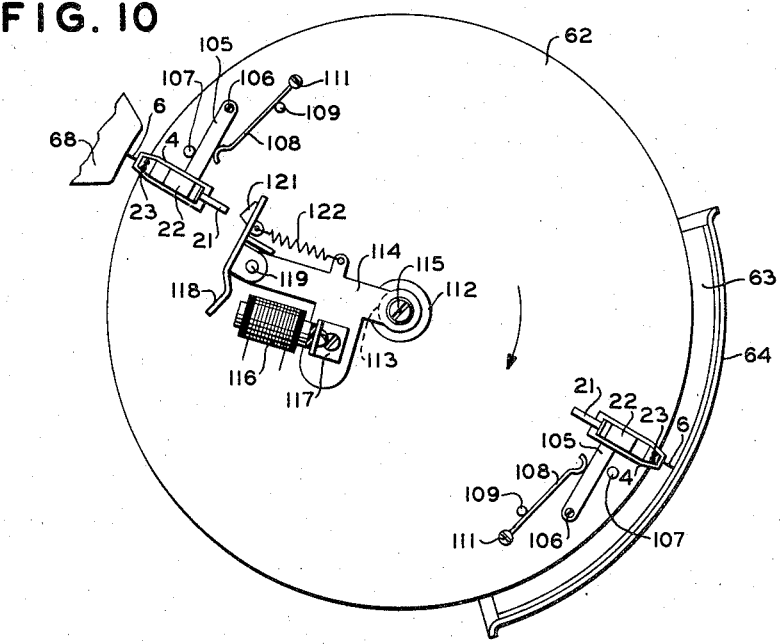
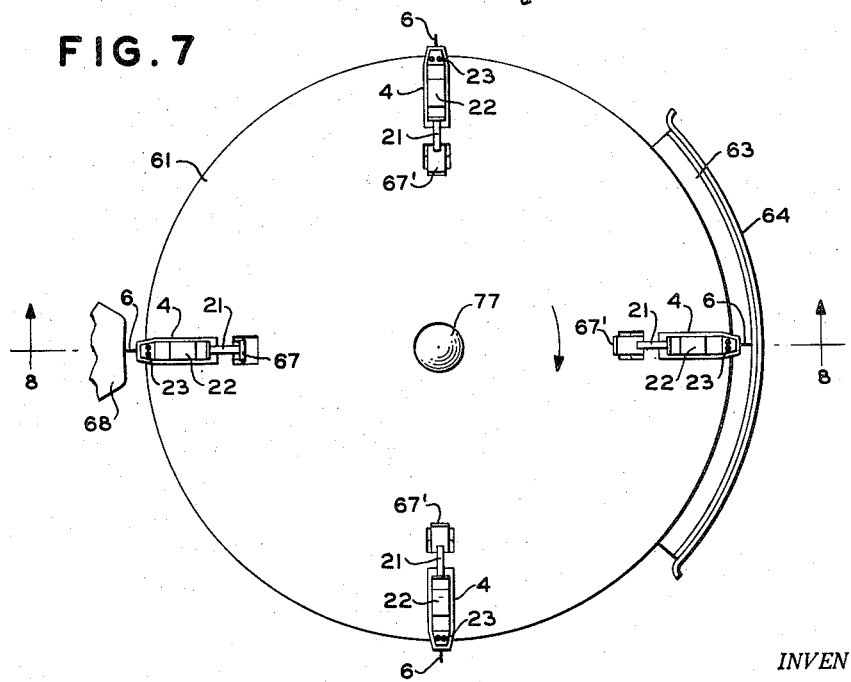
INVENTORS
R. J. WISE
D. M. ZABRISKIE
BY
ATTORNEY Sept. 2, 1958
R. J. WISE ET AL
2,850,350
SELF ADJUSTING STYLUS
Filed Dec. 3, 1953
4 Sheets-Sheet 3
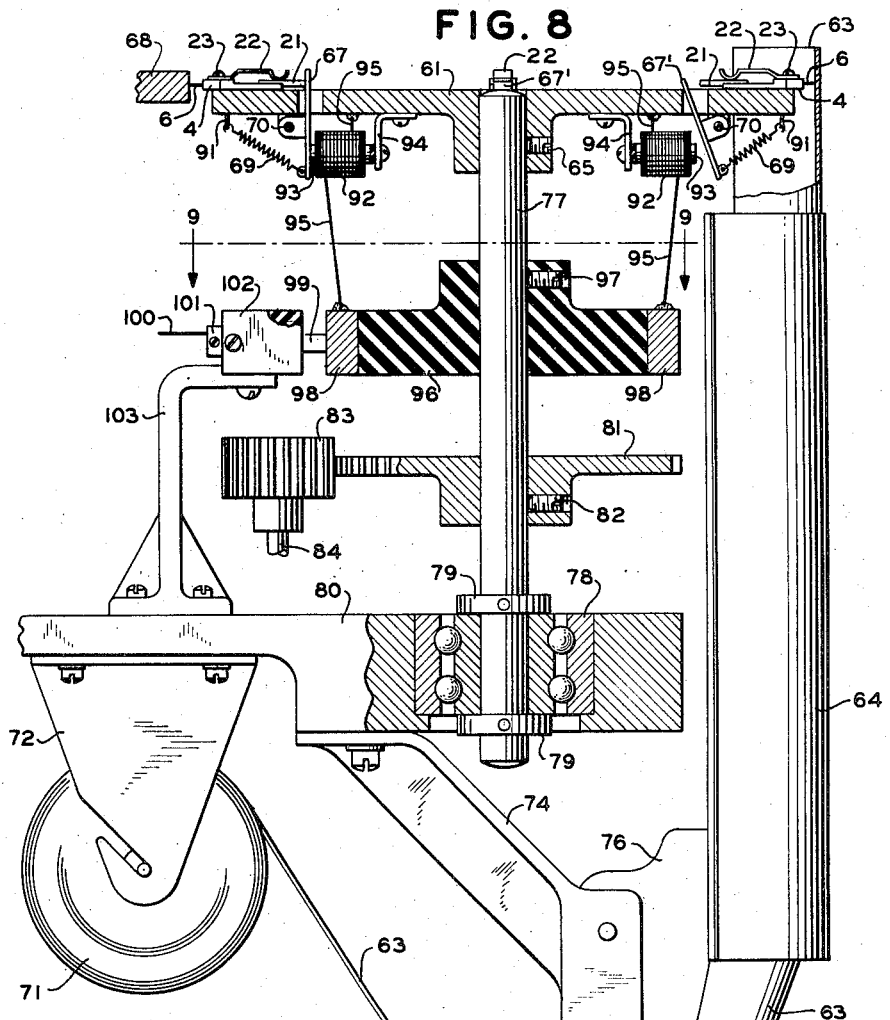
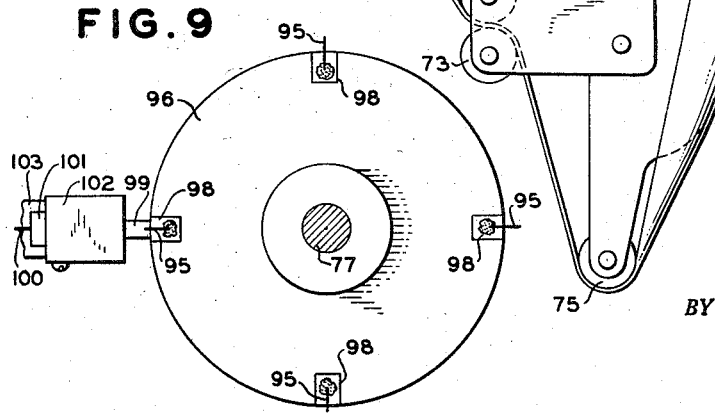
INVENTORS
R. J. WISE
D. M. ZABRISKIE
BY
ATTORNEY Sept. 2, 1958 R. J. WISE ET AL 2,850,350
SELF ADJUSTING STYLUS
Filed Dec. 3, 1953 4 Sheets-Sheet 4
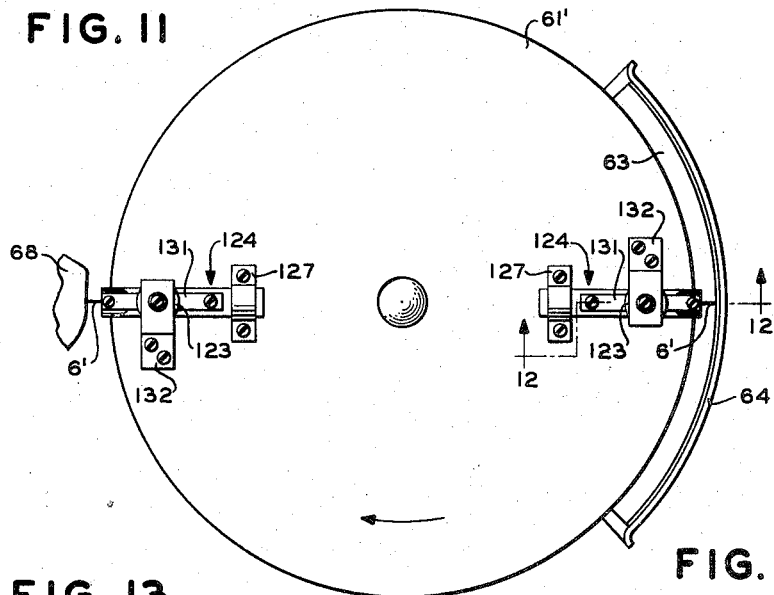
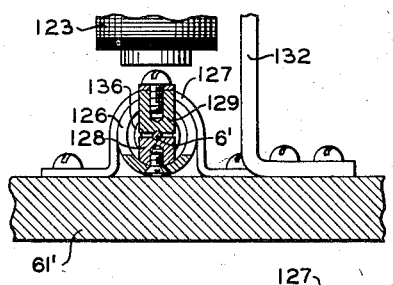
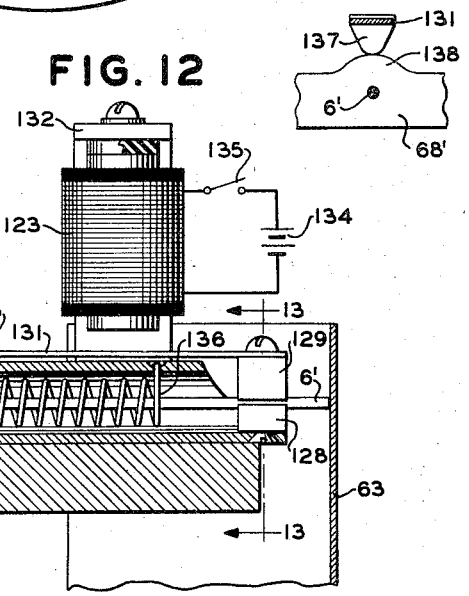
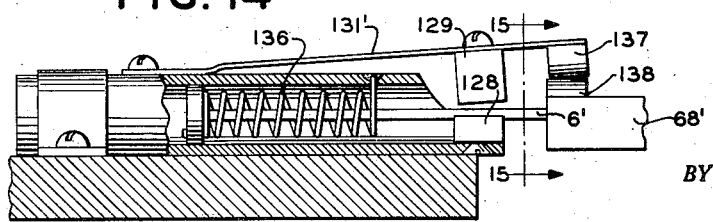
INVENTORS
R. J. WISE
D. M. ZABRISKIE
BY
ATTORNEY

United States Patent Office 2,850,350
Patented Sept. 2, 1958

2,850,350

SELF ADJUSTING STYLUS

Raleigh J. Wise, Arlington, and Douglas M. Zabriskie, Northvale, N. J., assignors to The Western Union Telegraph Company, New York, N. Y., a corporation of New York Application December 3, 1953, Serial No. 395,932

21 Claims. (Cl. 346—139)

In facsimile recorders of the type which use an electrically energized stylus for writing on electrosensitive paper, such as that disclosed in application Serial No. 279,261 by D. M. Zabriskie for "Facsimile Recorder" copending herewith, now Patent No. 2,783,120, issued February 26, 1957, it has been the practice to provide for manual adjustment of the length of the stylus so that shortening of the stylus due to wear can be corrected and also to make provision for periodic replacement of the stylus when it has become so shortened due to wear that it can no longer be advanced for adjustment. This rapid wear of the stylus occurs despite the fact that it is made of a very resistant material such as tungsten wire, for two principal reasons. First, it must be small in diameter in order to provide the required resolution of fine detail in the picture, and the consequent small cross-sectional area of the wire provides but little bearing surface with which to contact the naturally abrasive surface of the recording paper, resulting in a relatively high rate of stylus erosion. Secondly, the method of writing commonly employed utilizes a dry type of electrosensitive paper which requires the use of relatively high voltage and substantial current to mark the paper, accompanied by visible sparking or arcing which causes obvious consuming of the stylus electrode.

For these reasons it is necessary frequently to adjust the extent of stylus protrusion so that its contact with the recording paper will be maintained at a substantially uniform and optimum pressure within the range of permissible recording pressures appropriate to the recording paper being used. So necessary and frequent are these adjustments that in the facsimile recorder described in the above-mentioned copending application, a stylus gage has been incorporated as an integral part of the device in order that periodic adjustment of the stylus may be accomplished with a minimum of effort.

The present invention is concerned with an arrangement whereby the necessity for manual adjustment of the stylus is eliminated entirely by a mechanism for self-adjustment thereof which is operative to maintain optimum writing pressure at all times.

It is accordingly one of the objects of the present invention to provide a structure for maintaining correct stylus adjustment in a facsimile recorder throughout the life of the stylus.

Another object of the invention is to reduce the cost of facsimile communication by eliminating the labor necessary to adjust the stylus of the recorder.

A still further object of the invention is to render facsimile equipment more adaptable to use by unskilled personnel, by eliminating the need for a periodic service operation.

Additional objects of the invention will appear from the following description of a specific example of an embodiment thereof, when taken in conjunction with the drawings, in which:

Fig. 1 is an elevational view of a portion of a four-stylus recorder mechanism employing the concept of the present invention;

Fig. 2 is a profile of the device shown in Fig. 1;

Fig. 3 is a diagrammatic representation of a source of electrical pulses for the operation of the present invention;

Fig. 4 is a rear elevation of a portion of Fig. 1;

Fig. 5 represents a portion of Fig. 2 as seen at a different phase in its cycle of operation; and Fig. 6 is an enlarged plan view of a belt and stylus assembly constructed in accordance with the present invention.

Fig. 7 is a plan view of a rotary recording head having a percussive stylus advancing mechanism, according to the present invention;

Fig. 8 is a sectional view in elevation of Fig. 7;

Fig. 9 depicts the commutator portion of Fig. 8 in plan;

Fig. 10 is a plan view of a rotary recording head having a cam stylus advancing mechanism, according to the present invention;

Fig. 11 is a plan view of a rotary recording head having a spring stylus advancing mechanism, according to the present invention;

Fig. 12 is a sectional view of a portion of Fig. 11;

Fig. 13 is a sectional view of Fig. 12;

Fig. 14 is a sectional view of another embodiment of Fig. 12;

Fig. 15 is a sectional view of a portion of Fig. 14.

Referring now to Fig. 1, pulleys 1 and 2 carry the flexible metal belt 3, to which are attached stylus holders such as 4. Rotation of the pulley 2 by a motor, speed reducing gear, synchronizer and clutch not shown on the drawing causes these stylus holders to be carried laterally along the guide bar 5, during which travel the writing ends of the styluses 6, seen more clearly in Figs. 5 and 6, engage a slowly rising web of electrographic recording paper shown at 7 in Fig. 4, and mark it in accordance with the amplitude of an electric signal applied between the said styluses and web.

Conical cogs 8 on the surface of the pulleys engage corresponding holes 9 (Fig. 6) punched in the belt 3 in order to prevent any creep of the belt, and thus maintain the required accuracy of relationship between the lateral displacement of styluses 6 and the angular position of pulley 2, as required both for registration of successive line elements in the reproduction of facsimile copy, and also for the purposes of the present invention as hereinafter explained. A cam 10 in the form of a pin protruding from the side of pulley 2 is shown in such position as to engage in its rotation the operating lever 11 of a normally open single pole single throw momentary contact switch 12 affixed by screws 13 to the machine frame 27. A battery 16 connected between a terminal 14 of the said switch and the wire 18 is therefore enabled to supply momentary pulses of energy to the wires 18, 19 when manual switch 17 connecting the wire 19 and the other terminal 15 of the switch 12 is closed during rotation of the pulley 2. It is to be observed that for a given construction of the machine the momentary impulses appearing at wires 18 and 19 are phased in respect to the rotation of pulley 2 solely in accordance with and subject to the angular location of the pin 10, and since four rotations of the pulley 2 are required to complete one revolution of the belt 3, a momentary pulse can be supplied to the wires 18, 19 at any desired point in the passage of each of the styluses 6 around the pulley 2 by a suitable choice of angular position for installation of the pin 10.

In Fig. 2 is shown a side view of the apparatus of Fig. 1, wherein the styluses 6 are bottomed in axial holes in the chucks 21, which are secured to the stylus holders 4 by the flat springs 22. Stylus holders 4 are retained on steel belt 3 by welding or riveting, and travel with it, parallel to the plane of the paper 7. By providing an initial downward tension in the flat springs 22 of a sufficient magnitude, which tension is exerted on chucks 21 by reason of the retaining screws 23 threaded into the holders 4, the said chucks are caused to be held in place frictionally within the holders 4 subject however to axial sliding movement therein consequent to any large force which may be applied. Hammer 24 is journalled on a shoulder screw 26 in the machine frame 27 so that when released by the attraction of the latch 28 to the pole face 29 of magnet 31 it is urged forward by the tension spring 32 between it and the main frame 27 to strike the said chuck, driving it forward within the stylus holder. The magnet 31, which is secured to the bracket 33 by means of a screw 34 engaging its core, is energized by the passage through it of electrical pulses conducted thereto by means of its lead wires 35 and 36. These pulses may be generated locally by means of a suitably phased switching arrangement associated with the rotation of pulley 2 and supplied over the wires 18, 19, as described for Fig. 1 above or by the obvious equivalents thereof such as a commutator and brush means or a magneto revolving in unison therewith. They also may be obtained in accordance with the arrangement of Fig. 3, later to be explained.

When energized, magnet 31 lifts the latch 28 which swings upward about the shoulder screw 37 in bracket 33 against the tension of spring 38 which is hooked between latch and bracket to return the latch 28 to its downward position when magnet 31 is deenergized after release of the hammer. Hammer 24 is later raised into latching engagement of its attached hook 39 with latch 28 by the rotation of peg 41 carried on the face of pulley 2 as it slides over the inclined surface of cam arm 42 which is fastened to the hammer 24. It is thus seen that by energizing magnet 31 with a current pulse at the instant when chuck 21 is in the correct position, the spring operated hammer 24 is released to strike the chuck a light blow and is immediately restored to the cocked position by further rotation of the pulley 2.

The necessity for accurately phased operation of the magnet 31 can be avoided, if desired, by accurately locating the pin 41 so that cam arm 42 falls from it at the precise point in the operating cycle when hammer 24 is in position to strike chucks 21. It then becomes necessary only to energize magnet 31 continuously during the period when stylus advancement is desired. Switch 12 is thus eliminated, the method of connection for operation from phasing pulses according to Fig. 3 remains unchanged, and it becomes possible simply to operate the stylus advancement mechanism for a predetermined fixed period of time, as may be done, for example, with a thermal time delay cut-off energized by the scanning motor circuit and supplying power therefrom to the coil 31 for automatic stylus advancement during the starting period of each transmission.

Fig. 3 is a diagrammatic representation of a facsimile transmitter 43, of the kind fully disclosed in copending application No. 261,461 for Facsimile Telegraph Apparatus, filed December 13, 1951, by Pollard et al. In the said application, apparatus is described capable of providing information signals to a transmission circuit 44, 45, which may consist either of physical conductors for carrying the information signals or of physical guiding conductors for the transmission of high frequency waves modulated according to the said information signals, or of a radio link between transmitter and receiver for conveyance of similar modulated waves therebetween.

The information signals referred to above include phasing pulses which consist of rectangular pulses of continuous waves of a specific audio frequency. The leading edge of each pulse is precisely timed in respect to the start of the subsequent scanning line information signal. Since it is by means of these phasing signals that the transmitter and receiver are brought into synchronized operation during a period of a few seconds of automatic adjustment at the start of each transmission, as described in the above cited application, the said phasing pulses, although produced by a different machine, nevertheless bear a fixed phase relationship to the phase position of the styluses in the receiving machine, and can therefore be used to operate the magnet 31. It is of considerable further advantage that these pulses are transmitted for phasing purposes only during the initial few seconds of each transmission. A circuit 46 comprising a filter, demodulator, and amplifier constructed in accordance with the copending application of Diebert et al., Serial No. 261,462, filed December 13, 1951 and entitled "Facsimile Receiving Apparatus," now Patent No. 2,700,701, supplies suitable pulses at its output wires 47, 48 for attachment to the wires 35, 36 of magnet 31 to provide this automatic remote control of the stylus advancing mechanism whereby it operates for an adequate period of about 2½ seconds prior to the commencement of every message received.

In Fig. 4, being a rear view of the mechanism as seen from the front in Fig. 1 and from the side in Fig. 2, it clearly appears that the stylus holder 4 is not in a position beneath the hammer 24 at the depicted phase of the operating cycle, namely, at the instant of cocking. For this reason the brush 51 and the anvil 52 shown in Fig. 2, which cooperate in the functioning of the present invention, are seen in a remote position.

Fig. 5 is another view of a portion of the structure of Fig. 2 shown at the instant of chuck 21 being struck by the hammer 24, thus driving it into the stylus holder 4 despite the frictional drag imposed upon it by the pressure of spring 22, until its contained stylus 6 strikes the anvil 52, which consists of a suitable piece of resistant material, preferably hardened steel, and conveniently a bearing ball pressed into a blind hole in the angle block 53, which is secured to the pulley 2 by bolts 54, which compress it beneath the bristled brush 51 retained thereby.

It will be noted that the bristles 55 of the brush 51 are in this figure (Fig. 5) located above, that is to say, radially beyond the stylus 6, whereas in other views (Figs. 1, 2, and 4) which depict a different phase of the operating cycle, it is located interior to the said stylus. This is a consequence of so locating the said brush that the stylus must pass through the bristles thereof to round the pulley, and must again pass through the said bristles in the opposite direction in order to leave the pulley, both passages being accomplished once in every revolution of the stylus around the pulley. The stylus is thereby brushed free of debris accumulated during its travel across the record paper. The disruptive nature of the electrical marking of dry recording paper, and a carbonaceous ingredient of the paper which is employed to impart adequate conductivity to the paper, result in the liberation upon writing, of fumes which deposit on and cling to the stylus as a sooty deposit that can cause loss of definition in the record by enlarging the scanning area of the stylus unless it is removed periodically.

In recorders of prior construction this incrustation of the stylus with sooty deposits does not cause serious difficulty because it is necessary in any event to stop the machine periodically during its operation in order to readjust the protruding length of the styluses to compensate for stylus wear due to abrasion and erosion. Advantage is taken of this necessary stoppage and partial dismantling of the machine to clean the stylus at that time. Under the method of continuous operation made possible by the present invention, however, such periodic interruptions of service and readjustment of the styluses are no longer required in order to produce facsimile writing having a high degree of desirable contrast, since stylus adjustment is accomplished continuously and automatically, and the building up of such incrustations on the stylus must therefore be prevented by other means.

The arrangement described is not only successful in this respect, but is observed to provide an additional important advantage in that by cleaning the styluses thoroughly preceding ever scanning line, it ensures that even such loss of definition as has heretofore been tolerated between manual cleaning operations on the styluses, is now avoided.

In Fig. 6 is shown an enlarged plan view of a stylus holder 4 attached to a belt 3, and carrying a stylus 6 retained in the chuck 21. The groove 56 in the surface of the stylus holder 4 serves to retain the chuck 21 in correct elevation and alignment while permitting sliding motion therein to advance the stylus 6 through the hole 57 in the elevated anterior portion of the said stylus holder under the control of the spring 22.

In Fig. 7 is shown a form of this invention adapted to be used on a type of facsimile recorder which employs a rotating disc 61, although a skeletonized portion of a disc also may be used to carry the writing styluses in an arc against a sheet of record paper 63 which has been curled into conforming curvature by passage through a curved chute 64.

Four identical stylus holders 4 are shown, the following description applying to any selected one of them and its associated mechanism. Said stylus holder has the construction shown in Fig. 6 and is so located that an armature 67 protruding upward through a rectangular hole in disc 61 is enabled to strike the stylus chuck 21, advancing it, and the contained stylus 6, into contact with a fixed anvil 68, which is so located as to stop the said stylus at an extent of protrusion calculated to provide best marking by the stylus in its subsequent sweep across the record sheet 63.

Record sheet 63 is further seen in Fig. 8, which is an elevation view of the mechanism shown in plan in Fig. 7, to be advanced from roll 71, which is suspended from hangers such as 72, by rollers 73 journalled in the bracket 74 and driven by a motor not shown on the drawing, and by idler roller 75, from which it moves upwardly past a conical guide piece 76 and through the curved chute 64 over a distance sufficiently great to enable the record sheet to be curled into the desired longitudinal cylindrical curvature. This form of record sheet feeding and marking apparatus is advantageous in that it employs a simple and precise method of traversing the marking stylus across the record, and is especially well adapted for the production of records of relatively narrow width, such as brokers' tickets and the like, in which the moderate curvature required of the record sheet is easily obtained. The rotatable disc 61 is secured by a set screw 65 to the shaft 77 which is retained in a ball bearing 78 by the collars 79 affixed to the shaft. Bearing 78 is retained in a counterbored hole in the main frame 80 of the machine, and the said shaft and rotatable disc are rotated synchronously with the recurrence of incoming line scanning signals by means of a gear 81 affixed thereto by set screw 82, through the operation of pinion 83 on shaft 84 of a driving motor, not shown on the drawing. The said synchronism with a transmitter is conveniently maintained by the use of a synchronous motor drive from a common primary power network, or alternatively by any of the various expedients for synchronization well known in the art.

Actuation of the armature 67, which normally is pivoted about a fixed pin 70 into a retracted position by the tension of return spring 69 fastened between the armature and a hook 91 secured in the disc 61, is accomplished by electrically energizing the coil 92, the core 93 of which is attractively located adjacent to the said armature, and is fastened to the disc 61 by an angle bracket 94. Such an armature in the retracted position is shown on the drawing in a position symmetrically opposite to armature 67 and designated 67'. Coil 92 is energized by current flowing through a terminal 95 of the winding thereof, which is grounded to the disc 61. A commutator 96 is affixed to the shaft 77 by means of a set screw 97, and contains four symmetrically spaced commutator bars 98, each of which is individually connected to the opposite terminal of its corresponding coil 92 by a conductor 95. A conductive brush 99 in a holder 101 is mounted in a block of insulating material 102 on the arm 103 fastened to frame 80. This said brush contacts the several commutator segments successively in their rotation beneath it to close an electrical circuit through wire 100 affixed to the brush, to energize each of the coils 92 at a predetermined point in the passage of each stylus 6 across the face of anvil 68 for advancement thereof by striking the chuck 21 with the armature 67 during the said passage.

Fig. 9 is a plan view of the commutator 96 and the segments thereof, and of the brush and brush holder previously described, showing also the remote ends of wires 95 and their connection to the said segments.

In Fig. 10 is shown an alternative arrangement for advancing the styluses 6 as well as an improved structure for mounting the stylus for use in circumstances where unevenness in the thickness of paper 63 would otherwise cause stylus 6 to rupture the paper because of the unyielding nature of the curved chute 64, against which the paper rests. Stylus holders 4 are affixed to swingable arms 105 pivoted on screws 106 to the disc 62, the said arms being urged forward by the flexure of cantilever springs 108 affixed to the disc 62 at screws 111 and restrained by pins 109. As will be seen from the illustration, the stylus holder 4 is urged into contact with paper 63 by a predetermined pressure of the spring 108 when marking is in progress, but when rotated into proximity to anvil 68 the arms 105 assume a position in contact with the pins 107, so that adjustment of the stylus protrusion by mechanism later to be described will result in an invariable protrusion of the writing point of the stylus from the stylus holder and thus provide the constant and unchanging stylus pressure required for uniform writing, regardless of large amounts of wear experienced by the styluses.

A convenient material for the manufacture of styluses for electrographic recording is tungsten wire of small diameter. Because of its hardness and high melting point it is relatively less affected by the severe arcing incident to dry recording than are most other metals. Moreover, it is readily available and relatively inexpensive in the quantities required. However, due to its elongated crystalline structure, it has a fibrous nature as if composed of longitudinal filamentary elements imperfectly cohered into a cable-like structure. When subjected to impact, and especially to axial impact in a columnar configuration, it displays an undesired tendency to split longitudinally and splay into a brush at the impacted end. Such a result is undesirable both because of the weakening of the stylus and its probable mechanical failure in later use, and also because of the increased area of the writing point thereby produced, which causes loss of detail in the facsimile reproduction.

To avoid this impact effect, the arrangement of Fig. 10 may be employed. In this form, the stylus carrying disc 62 is affixed to a hollow quill 112 which serves the function of shaft 77 in Fig. 8. Through the center of this quill is passed a stationary rod 113 immovably affixed to the machine at its remote end, and carrying the bracket 114 secured to it by means of a screw 115. On bracket 114 is mounted coil 116 by means of angle 117. Armature 118 is pivoted to bracket 114 by means of pin 119, in attractive relationship to coil 116, and carries on its outer surface a cam 121. It is retained in a retracted position as shown when the coil is deenergized, because of the tension spring 122 affixed between it and the bracket 114. In this retracted position, cam 121 does not engage the stylus chucks 4, but when the coil 116 is energized, armature 118 turns about pin 119 to place the cam 121 in the path of stylus chucks 21. The stylus is thereby cammed into contact with the anvil 68 which operates as a gauge to set the protrusion of styluses 6 to a predetermined amount. It is thus seen that the advancement of styluses 6 is gradual in nature and not percussive, and that even this action occurs only when the coil 116 is energized. By energizing coil 116 only at spaced intervals, operation of the stylus advancement mechanism is restricted more closely to times when it is actually needed, and unnecessary battering of the styluses is avoided.

In Fig. 11 is shown a form of apparatus in which styluses 6' are advanced into contact with an anvil 68 when released by magnets 123 from the grip of stylus holders 124. As will be seen more clearly in Figs. 12 and 13, the stylus 6' is affixed to a plug 125 which is slideable within the cylindrical holder 124 affixed to the rotatable disc 61' by the clamp 127. A lower jaw 128 is secured to the said holder, and in cooperation with an upper jaw 129 which is fastened to and downwardly urged by a flat spring 131 bolted to the said cylinder, grips the stylus 6' to hold it immovable for marking against the record sheet 63. Brackets 132 fastened to the disc 61' support the electromagnet coils 123 above the springs 131 and these coils are shown diagrammatically to be energized by the battery 134 when the switch 135 is in the closed position. Since the coils 123 are located on revolving disc 61', connections between coils 123 and battery 134 or other suitable source of power are made through a commutator such as 96 of Fig. 8. By energizing coil 123 at a time when stylus 6' is opposite anvil 68, the spring 131 bearing upper jaw 129 is raised, and a tension coil spring 136 which is fastened between plug 125 and cylinder 126 causes stylus 6' to advance into contact with anvil 68 which is seen in Fig. 11. In this way, striking of the styluses is avoided and the advancing mechanism is somewhat simplified.

Another method of releasing the jaws 128, 129 for stylus advance is shown in Figs. 14 and 15, where spring 131' is shown modified by extending it sufficiently to retain a welded-on cam portion 137 arranged to be lifted by a protuberance 138 on the upper surface of anvil 68' during the passage of stylus 6' across the said anvil, whereby the stylus is released for advancement by the spring 136 during such passage. The protuberance 138 can also be replaced by an electromagnet such as 123 fixed to the anvil 68' or elsewhere, or by a permanent magnet if desired.

It is to be observed that although a spring 136 is shown as the means for advancing stylus 6' in the instant assembly, in view of the fact that the entire marking mechanism operates at a relatively high and constant speed of rotation, the centrifugal force acting upon plug 125 and stylus 6' can be used to augment or entirely replace the effect of spring 136.

By means of the present invention a further advantage is obtained, in that advancement of the stylus to its optimum position occurs with greater frequency than when manually adjusted and the stylus is therefore at all times more nearly in the same position relative to the recording paper. In consequence of the more uniform writing pressure thus developed by the styluses, the recording paper is less likely to be torn due to excessive pressure caused by operating variations in pressure, or due to the irregularities of pressure caused by the passage of the styluses over small imperfections which occur in the surface of the recording paper.

It will be obvious that various modifications, alterations and elaborations of the illustrative example of the invention shown in the drawings and described herein can be effected without departing from the spirit or the essential attributes of the inventive concept disclosed, and it is therefore intended that only such limitations be placed thereon as are specifically set forth in the appended claims.

What is claimed is:

1. In an electric marking facsimile recorder a flexible belt traversing a writing zone and a non-writing zone, a plurality of stylus holder means affixed thereto and having each a transverse guideway thereacross, a stylus mount in each such transverse guideway, stylus mount retaining means on the said stylus holder means whereby the said stylus mounts are frictionally secured thereon for scanning operation within said writing zone but capable of axial advancement by axial pressure within said non writing zone, stylus mount advancing means mounted adjacent the path of travel of the said belt in said non-writing zone, means for actuating said stylus mount advancing means, and a stylus gage mounted a fixed distance from the plane of the said belt in said non-writing zone, adapted to limit advance of the said stylus mounts under impetus of the said stylus mount advancing means whereby said means for actuating said stylus mount advancing means actuates the same to advance each said stylus mount along such transverse guideway within said non-writing zone until such advance is limited by said stylus gage.

2. In an electric marking facsimile recorder, disc means rotatable about a fixed axis for motion in a marking zone and a non-marking zone, at least one stylus holding means affixed thereto and having a radial stylus guideway therein, a stylus in the said stylus holding means, stylus clamping means attached to the said disc for securing the said stylus to prevent radial motion thereof in the said stylus holding means within said marking zone, a stylus positioning stop disposed in the radial path of stylus advancement when said stylus is in said non marking zone to limit advancement of the said stylus at a predetermined extent of stylus protrusion and stylus advancing means operable during a predetermined fixed phase of rotation cycle within said non-marking zone to render ineffective said stylus retaining means and to advance said stylus into contact with said stylus positioning stop.

3. In an electric marking facsimile recorder a flexible belt traversing a marking zone and a non-marking zone, a plurality of stylus holder means affixed thereto and having each a transverse guideway thereacross, an advanceable stylus mount in each such transverse guideway, stylus mount retaining means on the said stylus holder means whereby the said stylus mounts are frictionally secured for scanning operation in said marking zone but are capable of axial displacement by percussive impact in said non marking zone, hammer means mounted adjacent the path of travel of said belt, means for actuating said hammer means to engage said stylus mount with stylus advancing percussive impact while said stylus mount is in said non-marking zone, and a stylus positioning anvil mounted a fixed distance from the plane of said belt, adapted to limit advance of the said stylus mount under impetus of the said hammer means whereby said means for actuating said hammer means actuates the same to drive each of said stylus mounts along a transverse guideway in said stylus holder and into gauging contact of a contained stylus with said anvil within said non marking zone.

4. In an electric marking facsimile recorder a stylus carrier traversing a marking zone and a non-marking zone, a plurality of stylus holder means affixed thereto and having each a transverse guideway thereacross, a protruding stylus mounted in each such transverse guideway, a stylus advancing spring for each such transverse guideway, fixed at one end to the said stylus holder means and in forward urging contact with the said stylus at the other end of the said spring for advancing the said stylus along the said guideway, stylus clamping means for securing said stylus in place in the said guideway during the traverse of the said stylus carrier through said marking zone, a stylus gage mounted a fixed distance from the plane of the said stylus carrier adapted to limit advance of said stylus under forward urging of said spring to a predetermined fixed distance of stylus protrusion, stylus release means disposed to engage said stylus clamping means to cause it to release said stylus for advancement during a selected portion of the traverse of said stylus carrier through said non-marking zone.

5. In an electric marking facsimile recorder a stylus carrier traversing a marking zone and a non-marking zone, a plurality of stylus holder means affixed thereto and having each a transverse guideway thereacross, a protruding stylus mounted in each such transverse guideway, a stylus advancing spring for each such transverse guideway, fixed at one end to the said stylus holder means and in forward urging contact with the said stylus at the other end of the said spring for advancing the said stylus along the said guideway, stylus clamping means for securing said stylus immovably in place in the said guideway, during the traverse of the said stylus carrier through said writing zone, a stylus gage mounted a fixed distance from the plane of the said stylus carrier adapted to limit advance of said stylus under forward urging of said spring to a predetermined fixed distance of stylus protrusion, and means to release said clamping means during traverse of said non-marking zone.

6. In an electric marking facsimile recorder a stylus carrier traversing a marking zone and a non-marking zone, a plurality of stylus holder means affixed thereto and having each a transverse guideway thereacross, a stylus mounted in each such transverse guideway for axial protrusion therefrom, a stylus advancing spring for each such transverse guideway, fixed at one end to the said stylus holder means and in forward urging contact with the said stylus at the other end of the said spring for advancing the said stylus along the said guideway, stylus clamping means for immovably securing said stylus in place in the said guideway, during the traverse of the said stylus carrier through said writing zone, a stylus gage mounted a fixed distance from the plane of the said stylus carrier adapted to limit advance of said stylus under forward urging of said spring to a predetermined fixed distance of stylus protrusion, and magnetic stylus release means disposed to engage said stylus clamping means to cause it to release said stylus for advancement during a selected portion of the traverse of said stylus carrier through said non-marking zone.

7. The mechanism of claim 2 wherein the said stylus advancing means comprises a forwardly urging spring engaging said stylus and affixed to the said disc means, and a fixed cam operative upon the said clamping means at one point in its cycle within said non-marking zone to release the hold of said clamping means for advancement of said stylus by said spring.

8. The mechanism of claim 2 wherein the said stylus advancing means comprises a forwardly urging spring engaging said stylus and a magnet operative on the said clamping means at one point in its cycle within said non-marking zone to release the hold of said clamping means for advancement of said stylus by said spring.

9. The mechanism of claim 2 wherein the said stylus advancing means comprises a percussive means swingably mounted adjacent to the path of stylus advancement for applying stylus advancing percussive impact to the said stylus, and magnet means fixedly mounted in attractive relation to the said clamping means for timed repetitive coaction with the said percussive means.

10. In an electric marking facsimile recorder a flexible belt traversing a marking zone and a non-marking zone, a plurality of stylus holder means affixed thereto and having each a transverse guideway thereacross, a stylus carrying mount in each such transverse guideway, resilient stylus mount retaining rigidly affixed to the said stylus holder means whereby the said stylus mounts are frictionally secured for scanning operation within said marking zone but are capable of axial displacement by percussive impact in said non marking zone, hammer means mounted adjacent the path of travel of said belt, means for repetitive actuation of said hammer means to engage said stylus mounts with stylus advancing percussive impact within said non-marking zone, and a stylus positioning anvil mounted a fixed distance from the plane of said belt, adapted to limit advance of the said stylus mounts under impetus of the said hammer means whereby said hammer actuation means actuates said hammer means to advance said stylus carrying mounts axially along the transverse guideways in said stylus holder means and into gauging contact of a contained stylus with said anvil, within a non marking zone.

11. In an electric marking facsimile recorder adapted to be connected to a source of successive synchronized impulses, a flexible belt traversing a marking zone and a non-marking zone, a plurality of stylus holder means affixed thereto and having each a transverse guideway thereacross, a stylus carrying mount in each such transverse guideway, resilient stylus mount clamping means affixed to the said stylus holder means whereby the said stylus mounts are frictionally secured for scanning operation in said marking zone, but are capable of axial displacement by percussive impact in said non marking zone, hammer means mounted adjacent the path of travel of said belt in said non-marking zone, means responsive to said successive synchronized impulses for repetitively actuating said hammer means to engage said stylus mount with stylus advancing percussive impact, and a stylus positioning anvil mounted a fixed distance from the plane of said belt, adapted to limit advance of the said stylus mounts under impetus of the said hammer means whereby said impulse responsive means actuates said hammer means to advance said stylus carrying mounts axially along the transverse guideways in said stylus holder means and into gauging contact of a contained stylus with said anvil, within a non marking zone.

12. In an electric marking facsimile recorder adapted to be connected to a source of successive synchronized impulses a flexible belt traversing a marking zone and a nonmarking zone, a plurality of stylus holder means affixed thereto and having each a transverse guideway thereacross, a stylus carrying stylus mount in each such transverse guideway, clamping springs on the said stylus holder means whereby the said stylus mounts are pressed into frictional contact therewith, hammer means mounted adjacent the path of travel of said belt in said non-marking zone, means responsive to said successive synchronized impulses for repetitively actuating said hammer means to engage said stylus mounts with stylus advancing percussive impact within said nonmarking zone, and a stylus positioning anvil mounted a fixed distance from the plane of said belt in said non-marking zone, adapted to limit advance of the said stylus mounts under impetus of the said hammer means.

13. In an electric marking facsimile recorder adapted to be connected to a source of successive synchronized impulses a flexible belt traversing a marking zone and a nonmarking zone, a plurality of stylus holder means affixed thereto and having each a transverse guideway thereacross, a stylus carrying stylus mount in each such transverse guideway, clamping springs on the said stylus holder means whereby the said stylus mounts are pressed into frictional contact therewith, hammer means mounted adjacent the path of travel of said belt, in said non-marking zone, electromagnetic trigger means responsive to said successive synchronized impulses for repetitively actuating said hammer means from successive electrical synchronizing impulses to engage said stylus mounts with stylus advancing percussive impact within said nonmarking zone and a stylus positioning anvil mounted a fixed distance from the plane of said belt, adapted to limit advance of the said stylus mounts under impetus of the said hammer means.

14. In an electric marking facsimile recorder a flexible belt traversing a marking zone and a nonmarking zone, a plurality of stylus holder means affixed thereto and having each a transverse guideway thereacross, a stylus mount in each such transverse guideway stylus mount retaining means on the said stylus holder means whereby the said stylus mounts are immovably secured for scanning operation within said marking zone and are capable of axial displacement by percussive impact, hammer means mounted adjacent the path of travel of said belt to engage said stylus mount with stylus advancing percussive impact within said marking zone, means for actuating said hammer means, a stylus positioning anvil mounted a fixed distance from the plane of said belt, adapted to limit advance of the said stylus mounts under impetus of the said hammer means, and a brush located in the path of stylus travel whereby to engage the said styluses with sweeping contact in their passage thereacross.

15. In an electric marking facsimile recorder adapted to be connected to a source of successive synchronizing impulses, a flexible belt traversing a marking zone and a non-marking zone, a plurality of stylus holder means affixed thereto and having each a transverse guideway thereacross, a stylus carrying stylus mount in each such transverse guideway, clamping springs on the said stylus holder means whereby the said stylus mounts are pressed into frictional contact therewith, engaging means mounted adjacent the path of travel of said belt to engage said stylus mounts with stylus advancing percussive impact within said non-marking zone, means responsive to said successive synchronizing impulses for repetitively actuating said engaging means, a stylus positioning anvil mounted a fixed distance from the plane of said belt, adapted to limit advance of the said stylus holders under impetus of the said engaging means, and a brush located in the path of stylus travel whereby to engage the said styluses with sweeping contact in their passage thereacross.

16. In an electric marking facsimile recorder a flexible belt traversing a marking zone and a non-marking zone, a pair of belt pulleys rotatably mounted adjacent to such marking zone, guiding and driving said flexible belt in its travel therealong, a plurality of stylus holder means affixed to said belt, each having a transverse guideway thereacross, a stylus carrying stylus mount in each such transverse guideway, clamping springs on the said stylus holder means whereby the said stylus mounts are pressed into frictional contact therewith, hammer means mounted adjacent the path of travel of said belt to engage said stylus mounts with stylus advancing percussive impact within said non-marking zone, means to supply successive synchronized impulses to said recorder, means responsive to said impulses for repetitively actuating said hammer means, a stylus positioning anvil mounted a fixed distance from the plane of said belt, adapted to limit advance of the said stylus mounts under impetus of the said hammer means, and a brush located in the path of stylus travel whereby to engage the said styluses with sweeping contact in their passage thereacross.

17. In an electric marking facsimile recorder adapted to be connected to a source of successive synchronized impulses, a flexible belt traversing a marking zone and a non-marking zone, a pair of belt pulleys rotatably mounted adjacent to such marking zone, guiding and driving said flexible belt in its travel therealong, a plurality of stylus holder means affixed to said belt and having each a transverse groove thereacross, a stylus mount in each such transverse groove, a stylus in each such mount, clamping springs on the said stylus holder means whereby the said stylus mounts are pressed into frictional contact therewith, hammer means mounted adjacent the path of travel of said belt adapted to engage said stylus mounts with stylus advancing percussive impact within said non-marking zone, means responsive to said successive synchronized impulses for repetitively actuating said hammer means, a stylus positioning anvil immovably secured to one of the said pulleys in overhanging, stylus blocking relation to the said stylus mounts at a selected portion of their travel through said non-marking zone, adapted to limit advance of the said stylus holders under impetus of the said hammer means, and a brush affixed to the said belt pulley adapted to sweep the said stylus during passage therethrough by having bristles arranged opposed, in alignment, and for interference therewith.

18. In an electric marking facsimile recorder adapted to be connected to a source of successive synchronized impulses, a flexible belt traversing a marking zone and a non-marking zone, a pair of belt pulleys rotatably mounted adjacent to such marking zone for guiding and driving said flexible belt in its travel therealong, a plurality of stylus holder means affixed to said belt and having each a transverse groove thereacross, a stylus carrying stylus mount in each such transverse groove, clamping springs on the said stylus holder means whereby the said stylus mounts are pressed into frictional contact therewith, hammer means mounted adjacent the path of travel of said belt adapted to engage said stylus mounts with stylus advancing percussive impact within said non-marking zone, means responsive to said successive synchronized impulses for repetitively actuating said hammer means, a stylus positioning anvil immovably secured to one of said pulleys in overhanging, stylus blocking relation to the said stylus mounts at a selected portion of their travel within the said non-marking zone, adapted to limit advance of the said stylus mounts under impetus of the said hammer means.

19. In an electric marking facsimile recorder adapted to be connected to a source of successive synchronized impulses, a flexible belt traversing a marking zone and a non-marking zone, a pair of belt pulleys rotatably mounted adjacent to such marking zone, guiding and driving said flexible belt in its travel therealong, a plurality of stylus holder means affixed thereto and having each a transverse groove thereacross, a stylus carrying stylus mount in each such transverse groove, clamping springs on the said stylus holder means whereby the said stylus mounts are pressed into frictional contact therewith, hammer means mounted adjacent the path of travel of said belt to engage said stylus mounted with stylus advancing percussive impact within said non-marking zone, means responsive to said successive synchronized impulses for repetitively actuating said hammer means, a stylus positioning anvil immovably secured to a belt pulley in overhanging, stylus blocking relation to the said stylus mounts at a selected portion of their travel in the said non-marking zone, adapted to limit advance of the said stylus mounts under impetus of the said hammer means, and a bristled brush affixed to a said belt pulley having bristles aligned in stylus opposition for stylus sweeping interfering engagement upon stylus passage therethrough.

20. In an electric marking facsimile recorder, a flexible belt traversing a marking zone and a non-marking zone, a plurality of stylus holder means affixed thereto and having each a transverse guideway thereacross, a stylus carrying stylus mount in each such transverse guideway, a clamping springs on the said stylus holder means whereby the said stylus mounts are pressed into frictional contact therewith, hammer means resiliently mounted adjacent the path of travel of said belt to engage said stylus mounts with stylus advancing percussive impact within said non-marking zone, hammer retracting means responsive to the traverse of said flexible belt for repetitively energizing said hammer means, timing means controllingly connected to said hammer retracting means for actuation thereof during a predetermined interval, a stylus positioning anvil mounted a fixed distance from the plane of said belt, adapted to limit advance of the said stylus holders under impetus of the said hammer means, and a brush located in the path of stylus travel whereby to engage the said styluses with sweeping contact in their passage thereacross.

21. In an electric marking facsimile recorder, carriage means for cyclic traversing of a marking zone and a non-marking zone, at least one stylus holding means affixed thereto and an axially advanceable stylus in each of said stylus holders with the marking end of said stylus protruding therefrom, said stylus holding means having gripping means for normally restraining said stylus from movement in said stylus holding means, a stylus positioning stop disposed in the axial path of stylus advancement at one position of carriage travel in said non-marking zone to limit advancement of said stylus at a predetermined extent of stylus protrusion, and means operable at a predetermined fixed phase of stylus traversing cycle in the said non-marking zone to overcome gripping of the stylus in the said stylus holding means and to advance the stylus into contact with the said stylus positioning stop.

References Cited in the file of this patent

UNITED STATES PATENTS

| | | |
|---|---|---|
| 2,212,970 | Finch | Aug. 27, 1940 |
| 2,575,742 | Baltin et al. | Nov. 20, 1951 |
| 2,614,900 | Clarke et al. | Oct. 21, 1952 |